US012333035B1

(12) United States Patent
Kandregula et al.

(10) Patent No.: US 12,333,035 B1
(45) Date of Patent: Jun. 17, 2025

(54) DELEGATED FINE-GRAINED ACCESS CONTROL FOR DATA LAKES

(71) Applicant: Amazon Technologies, Inc., Seattle, WA (US)

(72) Inventors: Krishnaditya Kandregula, Redmond, WA (US); Douglas Brian Terry, San Francisco, CA (US); Sachet Saurabh, Sammamish, WA (US); Vinay Singh, Sammamish, WA (US); Michael Sklar Chess, San Francisco, CA (US); Grayson Osburn Vigeant Clendenon, Mountain View, CA (US); Frank Benkstein, Berlin (DE); Mehul A. Shah, Saratoga, CA (US); Abhijit Uday Pujare, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 17/937,441

(22) Filed: Sep. 30, 2022

(51) Int. Cl.
*G06F 21/62* (2013.01)

(52) U.S. Cl.
CPC .................. *G06F 21/6218* (2013.01)

(58) Field of Classification Search
CPC ..................................... G06F 21/6218
See application file for complete search history.

(56) References Cited

U.S. PATENT DOCUMENTS

| 7,243,097 | B1 * | 7/2007 | Agrawal | G06F 16/2452 |
| 8,065,329 | B2 * | 11/2011 | Lei | G06F 16/2453 707/662 |
| 8,352,475 | B2 * | 1/2013 | Bhatkar | G06F 21/6218 707/741 |
| 9,727,591 | B1 | 8/2017 | Sharma et al. | |
| 10,678,810 | B2 | 6/2020 | Rehal | |
| 10,885,134 | B2 * | 1/2021 | McGrath | G16H 10/60 |
| 11,042,516 | B2 * | 6/2021 | Vandiver | G06F 16/2282 |
| 11,163,904 | B2 * | 11/2021 | Barbas | G06F 16/24564 |

(Continued)

FOREIGN PATENT DOCUMENTS

| CN | 110036382 A | * | 7/2019 | ........... G06F 16/213 |
| CN | 115659389 A | * | 1/2023 | |
| WO | WO-2025011208 A1 | * | 1/2025 | ......... G06F 16/2433 |

OTHER PUBLICATIONS

Desmedt, Y., Shaghaghi, A. (2018). Function-Based Access Control (FBAC): Towards Preventing Insider Threats in Organizations. In: Samarati, P., Ray, I., Ray, I. (eds) From Database to Cyber Security. Lecture Notes in Computer Science(), vol. 11170. Springer, Cham. (Year: 2018).*

*Primary Examiner* — Michael R Vaughan
(74) *Attorney, Agent, or Firm* — Robert C. Kowert; Kowert, Hood, Munyon, Rankin & Goetzel, P.C.

(57) ABSTRACT

Respective delegation records indicating that a first access controller and a second access controller have been authorized to grant access to a respective set of cells of a table of a storage management service are stored. In response to receiving an access request of a data accessor, permission records indicating that the access controllers have granted permissions to the data accessor to respective subsets of the table's cells are identified. A collection of cells of the table to which the data accessor has been granted access permission is identified using the permission records, and a response to the access request is generated using the collection.

20 Claims, 10 Drawing Sheets

(56) References Cited

U.S. PATENT DOCUMENTS

| | | |
|---|---|---|
| 11,281,626 B2 | 3/2022 | Gorelik |
| 11,762,970 B2 * | 9/2023 | Yanacek .............. G06F 16/1774 726/1 |
| 2009/0287704 A1 * | 11/2009 | Yang ................... G06F 21/6227 707/999.009 |
| 2013/0086088 A1 * | 4/2013 | Alton .................. G06F 16/2455 707/754 |
| 2015/0378633 A1 * | 12/2015 | Sahita ................... G06F 9/3004 711/163 |
| 2018/0373781 A1 | 12/2018 | Palrecha |
| 2020/0301941 A1 | 9/2020 | Wilson et al. |
| 2021/0144517 A1 * | 5/2021 | Guim Bernat .......... H04W 4/08 |
| 2021/0150489 A1 * | 5/2021 | Haramati ............... G06F 16/252 |
| 2022/0021652 A1 | 1/2022 | Moghe et al. |
| 2022/0103518 A1 | 3/2022 | LaChance et al. |

* cited by examiner

DELEGATED FINE-GRAINED ACCESS CONTROL FOR DATA LAKES

BACKGROUND

Data lakes are centralized, curated and secured repositories that can be used to collect and store various types of data, both in raw formats and in formats which have been processed for analysis. Data lake management services enable clients to break down data silos and combine different types of analytics to gain insights and guide business decisions. The amount of data that is included within a data lake set up for an organization can grow quite large, and not all entities within the organization may need to access the entire set of data.

Figure 1:
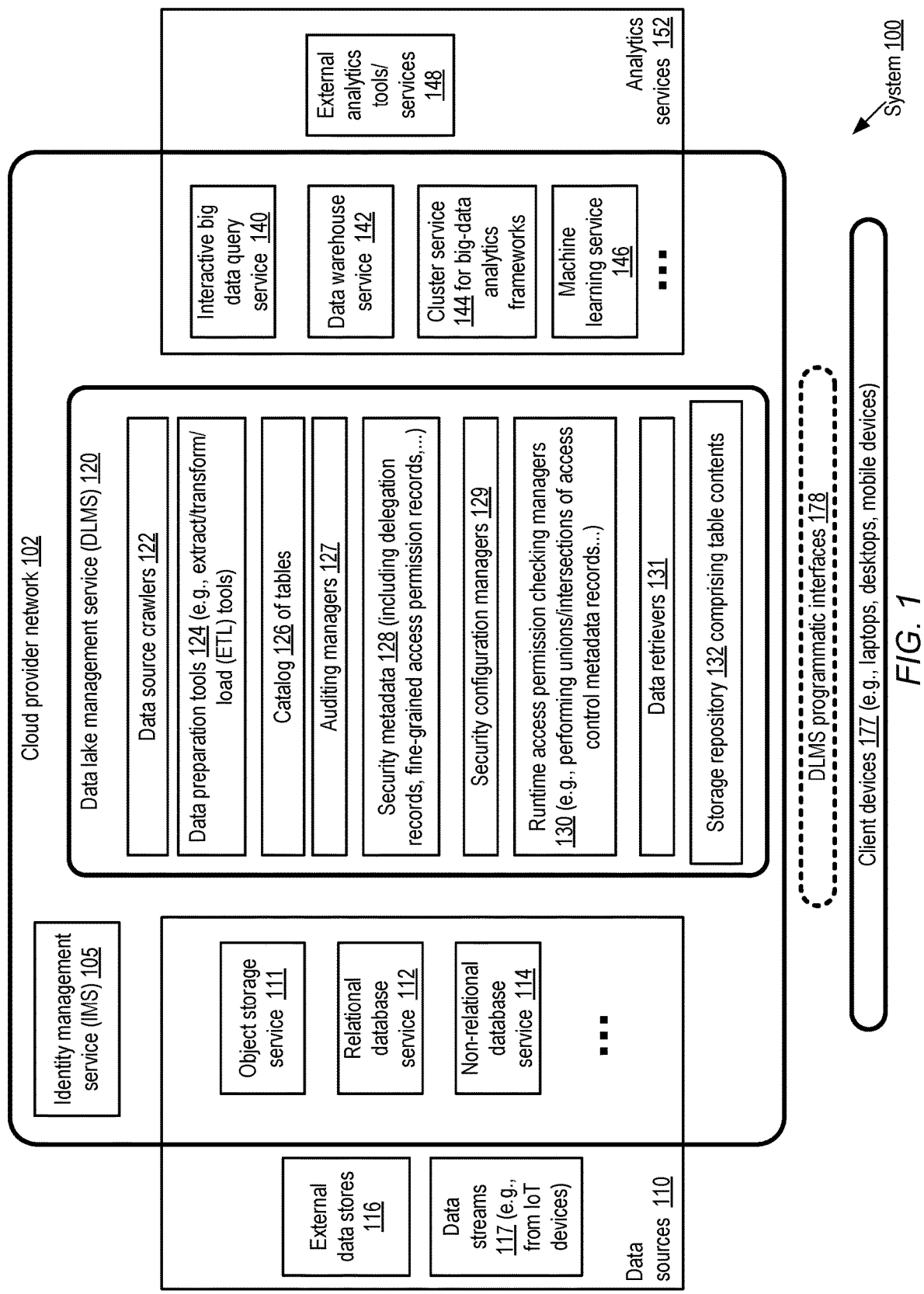
FIG. 1 illustrates an example system environment in which delegated access control techniques may be employed at a data lake management service of a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enabling delegation of access granting rights to data stored within large data lakes, enabling access control at any desired level of granularity to be implemented more efficiently than if access granting rights were managed by a single authority. Such techniques can be implemented at data lake management services of a cloud provider network, at which a given data lake instance for example may include content collected from a variety of data sources including relational and non-relational databases, object storage services at which unstructured data is stored, devices such as sensors that emit ongoing streams of data, and so on. A given data lake instance at such a service on behalf of an organization may comprise tables with millions of data records, with each data record or row potentially comprising hundreds or thousands of columns or fields. The contents of a given data lake instance may potentially be accessed by tens of thousands of users, some of whom may be affiliated with different client accounts of the provider network than others. Most data accessors, depending for example on their roles in the organization, may not need access to an entire table; in some cases, privacy concerns may dictate that access to some portions of the table be restricted. With more and more data being accumulated dynamically at a data lake, and with new data accessors (whose roles or job functions may change over time) potentially being added to the pool of data accessors, managing access control to a data lake table using a single central administrator (or even a small group of administrators) may become problematic. Such a centralized access control authority may itself become a bottleneck, preventing the data stored at the data lake from being analyzed quickly enough for making the best possible business decisions.

According to at least some embodiments, access granting rights for various portions of data lake tables may be delegated to help avoid such problems. An overall administrator designated for a given table may submit delegation requests programmatically, indicating respective portions of the table for which access granting rights are to be delegated to respective access controllers chosen by the overall administrator. For example, a given table may be modeled as a plurality of cells arranged in rows and columns, and a particular individual selected as an access controller may be given the ability to grant read access to a specified set of cells of the table, such as all the cells of a selected group of columns. Respective delegation records (DRs) may be stored as part of the metadata maintained the data lake service in some embodiments corresponding to a given delegation request. A given DR may for example identify the access controller to whom the ability to grant access is being delegated, the set of cells for which the access controller can grant access, the types of access (read-only, read-write, etc.) for which permission can be granted, a time duration for which the access controller is permitted to grant access to the set of cells, and so on. Delegation records may also be referred to as delegated access granting rights records.

After the access controller has been designated for a set of cells via a delegation request, the access controller may grant access permission to subsets of the set (or all cells of the set). In some cases the permission may be granted in response to explicit permission requests from potential data accessors, while in other cases permissions may be granted without receiving explicit permission requests (e.g., proactively based on policies pertaining to the data lake contents). A permission record indicating the group of one or more cells to which a given data accessor has been granted access may also be stored as part of the data lake's metadata in various embodiment. In some cases, numerous such permission records applicable to a given data accessor DA1 may be created—e.g., read access permission to a particular group of cells G1 of a table T1 may be granted to DA1 by a first access controller AC1 using AC1's delegated access granting capabilities, read access permission to another group of cells G2 of T1 may be granted to DA1 by a second access controller AC2 using AC2's delegated access granting capabilities, and so on. When contents of a table are to be accessed on behalf of a data accessor, e.g., in response to a request to read a portion of the table, or to perform analysis on the table, the relevant permission records applicable to the data accessor may have to be quickly identified, and a determination may have to be made as to which portions of the table the data accessor has permission to access.

In at least some embodiments, an effective access computation engine of the data lake management service may be employed to determine such portions of the table dynamically by looking up and aggregating the applicable permission records. The aggregation process may comprise set operations such as generating unions of cell sets and/or intersections of cell sets indicated in several permission records in various embodiments. Using the permission records identified for a given data accessor and a given table, a first collection of cells of a table to which the data accessor has access may be identified.

Depending on the type of request received from the data accessor, in some cases only the cells of the first collection may have to be examined to generate a response to the request. For such types of requests, responses may be generated in a fairly straightforward manner. In other cases, the data accessor may have requested an analysis of the table as a whole, or an analysis of portions of the table that include at least some cells to which the data accessor has not been granted access permission. In some scenarios, the owner or administrator of a table may provide rules or logic to be used to modify or obfuscate portions of the table to which the data accessor has not been granted permission, prior to generating a response which requires examination of cells to which the data accessor does not have access. Accordingly, in at least some embodiments, to prepare the response to the data accessor, values stored within one or more cells to which the data accessor does not have access permission may be modified or substituted (e.g., using null values, estimated mean/median/mode values, etc.), while values stored within cells to which the data accessor has permission may not be modified. In effect, a modified version of the table (which may not necessarily be stored in persistent storage) may be used to respond to a data accessor's request in such embodiments, in which some cell contents (to which the data accessor does not have permission) have been replaced, while other cell contents (to which the data accessor has permission) remain unchanged.

As one skilled in the art will appreciate in light of this disclosure, certain embodiments may be capable of achieving various advantages, including some or all of the following: (a) helping to ensure that respective portions of a data lake's contents can be accessed quickly by large numbers (e.g., tens of thousands) of data accessors with different requirements quickly, without slowdowns resulting from the use of centralized access control authorities and/or (b) reducing the probability of leakage of sensitive data which may be stored within data lakes, e.g., by delegating authority for access control decisions to entities or individuals who have more detailed knowledge of the roles and responsibilities of different data accessors.

According to some embodiments, a system may include one or more computing devices. The computing devices may include instructions that upon execution at the computing devices receive one or more delegation requests via one or more programmatic interfaces from an administrator or owner of a table stored at a data lake management service (DLMS) of a cloud provider network. In response to the delegation requests, a plurality of delegation records (DRs) may be stored as part of metadata maintained at the DLMS. The table may include a plurality of cells, arranged for example in rows and columns. The administrator may be authorized to delegate access granting rights pertaining to the table. The DRs may include a first DR that identifies a first access controller who is to be authorized (subsequent to the receipt of the delegation request(s)) to grant access to a first set of cells of the table, and a second DR which identifies a second access controller who is to be authorized to grant access to a second set of cells of the table. The access controllers may, for example, be employees of the organization on whose behalf the table is created and used as part of the data lake; such employees may in some cases have more detailed knowledge regarding the job roles and responsibilities of other individuals or teams which may access the data stored in the table. Note that the table administrator may retain the capability of granting access to portions of the table in various embodiments; that is, delegating the rights to the other access controllers may not reduce the rights of the table administrator. The access controllers to whom rights are delegated by the table administrator may also be referred to as rights granters or delegated access controllers (DACs) in some embodiments.

Subsequent to the creation and storage of the DRs, the access controllers indicated in the DRs may grant permission to read and/or write portions of the respective sets of cells to data accessors in various embodiments, and such grants may result in the creation and storage of permission records in the DLMS's metadata. A first permission record indicating that a first data accessor has been granted access by the first access controller to a first subset of cells of the first set may be stored in the DLMS metadata, and a second permission record indicating that the first data accessor has been granted access by the second access controller to a second subset of cells of the second set may be stored.

At some point in time, an indication that at least a portion of the table is to be accessed in response to a particular request from the first data accessor may be obtained at the DLMS. In some cases, the request may be received directly from the first data accessor at the DLMS; in other cases, the request may be initially directed from the first data accessor to an analytics service or tool, and the analytics service or tool may in turn indicate to the DLMS that the table is to be accessed. A group of permission records applicable to the first data accessor may be identified at the DLMS, and used to identify a first collection of cells of the table to which the first data accessor has access. The first collection may include a first cell comprising a first data value, and the first collection may exclude at least a second cell which comprises a second data value. A modified version of the table may be utilized to respond to the particular request in some embodiments. In the modified version of the table, the second data value may be replaced by a third data value, while the first data value may remain unchanged. As such, contents of at least some cells to which the first data accessor does not have access may be modified for the purpose of responding to the first data accessor's request in such embodiments. A transient modified version of the table may be used to respond to the client's request in one embodiment, while retaining the original unmodified version of the table in persistent storage. In some cases, in which the request from the first data accessor requires examination of only those cells to which the first data accessor has permission, modification of values in other cells may not be needed.

Any of a number of different patterns may be employed to specify the particular set of table cells for which access granting rights are delegated. For example, a row-based pattern may be used, a column-based pattern may be used, or an arbitrary set of cells (which may not necessarily be adjacent to one another) may be specified in a delegation request in some embodiments. In a row-based pattern, the set of cells covered by the delegation (i.e., the cells for which the delegated access controller can grant access permissions) may include cells in one or more rows, but may exclude all cells of one or more other rows. In a column-based pattern, the set of cells to which the delegated access controller can grant access may include all the cells within one or more columns, but may exclude any cells from one or more other columns. In the arbitrary cell pattern, the set of cells covered by a delegation request or DR may include one or more cells within a particular row, while excluding at least one cell from the particular row.

The sets of cells for which access granting rights are delegated in one DR may overlap at least in part with the set of cells for which another DR is generated in response to another delegation request in some embodiments. As such, two different delegated access controllers may be able to grant access to the same cell of a given table in such embodiments.

A given permission record which indicates cell access permissions, and may be generated at a DLMS in response to a programmatic request from a delegated access controller (or a table administrator or account administrator), may be applicable to one or more data accessors in some embodiments. For example, a single permission record may indicate that all the users which belong to or are affiliated with a given provider network client account can access a particular subset of cells, or that all the users which belong a particular user group of a plurality of user groups can access a particular subset of cells. Some permission records may be applicable to individual data accessors or users.

In some embodiments, the data contained within a given cell of a table may be hierarchical in nature—e.g., a cell used for storing address information may be modeled as a collection of lower-level cells or sub-cells respectively representing a street name and number, a city name, a state/province name, a country name, a postal code, etc. DRs and/or permission records may be applied to such lower-level cells in some embodiments. For example, a particular delegated access controller may be permitted to grant access only to the state and country name lower-level cells of the address cells. Similarly, a given data accessor may only be permitted to access the city names and postal codes of various address cells, and not permitted to access the street information in another example scenario.

The set of cells which are associated with or covered by a DR (and may also be referred to as a data cell filter) and/or a permission record may be specified in any of several ways in different embodiment. For example, the cell coordinates (the names/identifiers of the columns, and/or names/identifiers of the rows to which the cells belong) may be specified, thereby explicitly identifying the cells to which the DR applies in one example scenario. In another scenario, logical predicates or expressions which can be evaluated to identify the cells covered by the DR may instead be specified in a delegation request and stored in the DR, and identifiers or coordinates of the cells may not be included in a delegation request or DR. A logical predicate such as "all columns whose column name excludes the string 'salary' and excludes the string 'phone'" may be used to specify the set of columns to which access is being delegated, for example. In some embodiments administrators may assign tags (e.g., strings chosen by the administrators) to columns and/or rows, and define expressions utilizing the tags to specify the set of cells of a DR. Tags may also be assigned to data accessors or groups of data accessors and used to define DR. The definition of DR cell sets using logical predicates may be extremely helpful, for example, in cases where new data cells is being received from streaming data sources; using logical predicates which can be applied both to earlier-collected data and newly-arriving data, the administrator of a table can avoid having to create new DRs. In some embodiments, different DRs and/or permission records may be used for read accesses versus write accesses directed to data lake tables, or the type of access (e.g., read-only versus read-and-append-only versus read-and-write) may be indicated in the DRs and/or the permission records.

In various embodiments, the DLMS may be closely affiliated or associated with one or more analytics services, such as a cluster management service which implements big data analytics frameworks, or a machine learning service. Such analytics services may be used to process the data in the data lake on behalf of various users or data accessors. In some embodiments, representations of the permission records indicating which portions of tables a given data accessor is permitted to access may be transmitted or propagated from the DLMS to an affiliated analytics service, or made accessible from the analytics service, and used by the analytics service to respond to an analytics request from a data accessor. As such, the task of determining which set of cells can be analyzed on behalf of a given data accessor may be performed at the analytics service instead of at the DLMS itself.

According to one embodiment, a DLMS may comprise a set of data store "crawlers." A crawler may read and examine the raw data of a data store to which it is provided access by an administrator of the DLMS; the raw data may in some cases be stored in non-relational or unstructured formats for which a schema defining column names and the like may not necessarily be available in advance. The crawler may be configured to automatically infer a schema (including identifiers or names of columns) for a portion of a data store. Such an inferred schema may be used to construct or generate a data lake table from the raw data of the data store in some embodiments. In at least one embodiment, after the schema has been inferred for a table, the schema (including column names) may be presented to an administrator designated for the table, and the administrator may then use the schema elements such as column names to specify the cells to which a delegation request applies. Note that in some cases, the schema for a given data set (e.g., a streaming data set, whose records' logical content fields may change over time) may be re-inferred and if needed dynamically modified over time at a DMLS. In some cases, a given table may combine data from several different data sources.

In at least some embodiments, as indicated above, a DLMS may be implemented at a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, at least a subset of the resources being used to process service requests at a given service such as a data lake management service may be located within a provider network region, at an edge location of the provider network, or at a provider network extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location may comprise a portion of a client-owned premise at which one or more data plane servers at which compute instances or other logical resources of the provider network can be launched are located. Special highly secure channels using various kinds of tunneling technologies may be established for transmitting commands (e.g., commands to launch compute instances and/or containers) from the control plane servers of the provider network (which remain at provider network data centers) to the extension location data plane servers in various embodiments.

The cloud provider network may implement various computing resources or services, which may include (in addition to a DLMS) a virtualized computing service (VCS), other data processing service(s) (e.g., map reduce, data flow, and/or other large scale data processing techniques), data storage services (e.g., database services, object storage services, file system services, block-based storage services, or data warehouse storage services), analytics services, packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A virtualized computing service of a cloud provider network may offer compute instances (also referred to as guest virtual machines, or simply "instances") with varying computational and/or memory resources, some of which may be utilized for other service such as a DLMS. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer or for use as front-end nodes (e.g., request router nodes) or back-end nodes (such as logic implementation nodes) of other services, e.g., based (at least in part) on input from the customer or administrators of the other services. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client.

The traffic and operations of the cloud provider network (or individual services of the cloud provider network, including the DLMS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which delegated access control techniques may be employed at a data lake management service of a cloud provider network, according to at least some embodiments. As shown, system 100 comprises resources and artifacts of several network-accessible services of a cloud provider network 102, including a data lake management service (DLMS) 120, an identity management service 105, an object storage service 111, a relational database service 112, a non-relational database service 114, an interactive big data query service 140, a data warehouse service 142, a cluster service 144 for big-data analytics frameworks, and a machine learning service 146. The DLMS may include one or more data source crawlers 122, additional data preparation tools 124 (such as extract/transform/load or ETL tools), a catalog 126 of tables, auditing managers 127, access control and security metadata 128, security configuration managers 129, runtime access permission checking managers 130, data retrievers 131 and a storage repository 132 comprising contents of tables that have been loaded into data lakes.

The DLMS may implement a set of programmatic interfaces 178 in the depicted embodiment, such as one or more web-based consoles, command-line tools, application programming interfaces (APIs), graphical user interfaces and the like. The programmatic interfaces 178 may be used by clients or customers of the DLMS to submit various types of messages or requests from client devices 177 such as desktops, laptops or mobile devices and to receive corresponding responses in the depicted embodiment. DLMS clients may include, among others, administrators/owners of data lake instances set up at the DLMS, administrators/owners of specific tables set up within data lake instances, delegated access controllers (DACs) to whom the rights to grant access to portions of tables (or entire tables) have been delegated by data lake administrators or table administrators, as well as data accessors wishing to access contents of data lakes. Information about the clients may be stored within an identity management service (IMS) 105 of the provider network in the depicted embodiment, indicating for example the provider network client accounts to which each data accessor belongs, user groups (if any) to which each data accessor belongs, roles/capabilities assigned to data accessors, and so on.

A data lake instance or example may be created at the DLMS in response to a programmatic request from a DLMS client received via interfaces 178, and populated with data obtained from one or more data sources 110. Some data sources may be internal to the provider network, such as unstructured or partially-structured objects stored at object storage service 111 or database content, with the database content being stored at relational database service 112 and/or non-relational database service 114. Other data sources may be external to the provider network 102, such as external data stores 116 (e.g., data sets stored at premises of clients of the DLMS), data streams 117 (such as ongoing arrivals of records originating at Internet-of-Things (IoT) devices) and the like. Different data lake instances may be set up on behalf of respective DLMS clients—e.g., one data lake instance DLI1 may be set up on behalf of a client C1, and loaded with data from a first set of data stores specified as data sources by C1, while another data lake instance DLI2 may be established on behalf of another client C2, using data from a second set of data stores specified as data sources by C2. A given client C1 may also establish multiple data lakes at the DLMS, e.g., to collect and analyze respective sets of data pertaining to different parts of an organization or business.

Data source crawlers 122 and data preparation tools 124 may be used to examine raw data stored at specified data sources, infer table schemas for the raw data (such as names and data types of columns) if the data source does not already provide schemas, transform the raw data if needed to prepare it for analysis using analytics services 152, and store a local copy of the table according to the schema(s) at storage repository 132. The catalog 126 may comprise metadata pertaining to the tables in the depicted embodiment, such as the schemas of the tables, the sources from which contents of the tables were retrieved, identifiers of the owners/administrators of the tables, and so on. Individual ones of the tables of a data lake may be modeled as a plurality of cells, with each cell belonging to a given column (or field) and a given row (or record) of the table in various embodiments. It is noted that while much of the description herein describes tables as the types of data objects stored in the data lake, and describes each table using a row/column/cell data model, other types of objects and data models may be employed in some embodiments. The delegated access control techniques introduced herein are not limited to any particular kind of data object (such as tables) or any particular underlying data model, and as such may be utilized to achieve similar benefits to those outlined earlier regardless of the data model used.

Analytics services 112 may be used to perform analysis of the contents of the tables in various embodiments, e.g., in response to queries or requests received from data accessors. Some of the analytics services may be internal to the provider network, such as interactive big data query service 140, data warehouse service 142, cluster service 144, and machine learning service 146. External analytics/tools services 148 (e.g., programs implemented at client premises) may be used instead of or in addition to the provider network's analytics services in some embodiments for certain types of requests. The DLMS may simplify the ingestion and analysis of large amounts of data from multiple diverse sources for a variety of clients in the depicted embodiment. For example, once access control settings have been established by a table administrator or a data lake owner for a particular data lake's tables, end users may access respective portions of the table contents either directly or via queries directed to analytics services, without having to provide additional details about the An administrator of a table of a data lake may be able to grant access to any portion of the table to one or more data accessors (e.g., readers or writers) in the depicted embodiment, e.g., in response to programmatic permission requests. In addition, a table administrator or a data lake administrator may also be permitted to delegate rights to grant access to table contents to other entities, referred to as access controllers. Such delegation may be performed for a variety of reasons in different embodiments, such as a desire to remove bottlenecks for accessing data, a desire to transfer responsibilities for access management to entities and individuals who are more familiar with the roles/responsibilities of data accessors, and so on.

An administrator may submit one or more delegation requests via programmatic interfaces 178 in the depicted embodiment. A given delegation request may indicate an access controller to whom the right to grant access to a specified portion (e.g., some set of cells) of a table to end users or data accessors is being delegated by the administrator. Corresponding to individual ones of such delegation requests, one or more delegation records (DRs) may be generated and stored as part of security metadata 128 by a security configuration manager 129 in some embodiments. Contents of a DR may include identification information of the access controller to whom the rights are being delegated, a specification or indication of the set of cells for which access granting rights are being delegated, and/or other elements discussed on further detail below.

After a delegated access controller (DAC) has been delegated the rights to enable access to a set of cells, that DAC may start granting read and/or write access to subsets or all of the cells. A respective permission record indicating that access has been granted for one or more cells to one or more data accessors may be stored, e.g., by security configuration managers 129 in response to programmatic requests from the DAC as part of the security metadata. In many cases, e.g., for large tables which may include millions of rows and thousands of columns, different DRs may be created and stored for different portions of the tables, identifying respective DACs to whom access granting rights and responsibilities have been delegated. For example, to indicate that permission to read a first group of cells of a table T1 has been granted to a particular data accessor DA1, a first DAC may cause a permission record PR1 to be generated and stored. Similarly, to indicate that permission to read a second group of cells of table T1 has been granted to DA1, a second DAC may cause a permission record PR2 to be generated and stored.

When data of a given table has to be accessed on behalf of a given data accessor, e.g., either in response to a query or request received via programmatic interfaces 178 from the data accessor, or in response to a query or request received from an analytics service acting on behalf of the data accessor, the portion (if any) of the table to which the data accessor has been granted access permission may have to be identified quickly in various embodiments. A runtime access permission checking manager 130 of the DLMS may identify the group of permission records applicable to the data accessor and the table in the depicted embodiment, e.g., using a set of indexes constructed for the security metadata 128. The applicable permission records may be processed (e.g., by performing set computation operations such as union operations and/or intersection operations) to identify the cells of the table to which the data accessor has been granted access permission. For some types of queries, whose responses can be generated entirely from the subset of cells to which the data accessor is granted permission, a data retriever 131 may simply transmit the needed data for a response from the storage repository 132. In some cases, however, a response to an analytics request or query from the data accessor (or from an analytics service or tool acting on behalf of the data accessor) may not be generated without accessing at least some version of the data of table cells to which the data accessor does not have access permission. For example, the request from the data accessor may require an aggregation over values within one column of all rows of the table to be performed, but the data accessor may only have access to a subset of the rows. In such a scenario, a modified version of the table may be used to respond to the request. In the modified version, the contents of one or more cells to which the data accessor does not have access permission may be modified or substituted (for example by replacing the original contents with null values, an estimate average or a generic value), while contents of cells to which the data accessor does have access permission may be left unmodified.

In at least some embodiments, the DLMS may comprise one or more auditing managers 127, which are responsible for the generation of audit records pertaining to various aspects of the operations performed at the DLMS, including the creation of DRs, the creation of permission records, and/or the reads or writes directed to the tables stored at the DLMS. Audit records for the creation of DRs may for example identify the administrator whose delegation request led to the creation of the DR and the access controller to whom rights are delegated, a timestamp of when the delegation request was received, the cells to which access granting rights are being delegated etc. Audit records for the creation of permission records may for example identify the access controller granting the permission, the data accessors to whom permissions are being granted, a timestamp of when the permissions were granted, the cells to which access was granted etc. Audit records pertaining to the reads/writes may indicate the specific cells that were read and/or written, the data accessor at whose request the cells were read/written, a timestamp indicating when the cells were accessed, and so on. Such audit records may be provided to authorized entities (such as data lake owners/administrators) via programmatic interfaces 178 in various embodiments upon request.

The sets of cells for which DRs and/or permission records are generated may be selected using any of several patterns in different embodiments—e.g., all cells belonging to a subset of rows of a table may be selected, all cells belonging to a subset of columns of a table may be selected, or arbitrary combinations of cells (which may not be required to be adjacent) may be selected. Cells may be specified using logical predicates (e.g., Boolean constraints on strings or substrings of column names) or by providing specific identifiers or coordinates in different embodiments, for DRs or for permission records. Any of a number of languages or Structured Query Language (SQL) dialects such as PartiQL or HiveQL, or variants thereof, may be used to specify the logical predicates in different embodiments. The cells of a given DR may overlap with cells of other DRs in some embodiments; that is, permission to grant access to a given cell of a table may be delegated to multiple access controllers by the administrator. Permission records may indicate groups of data accessors, e.g., data accessors belonging to a particular user group defined within the identity management service or all data accessors that utilize a given client account of the provider network, in some embodiments; as such, access permissions may be granted to multiple data accessors using a single permission record if desired. In some embodiments, a given cell of a table may be modeled as a hierarchy of lower-level cells or sub-cells, and DRs or permission records may apply to some lower-level cells while not being applicable to other lower-level cells of the same parent cell.

Figure 2:
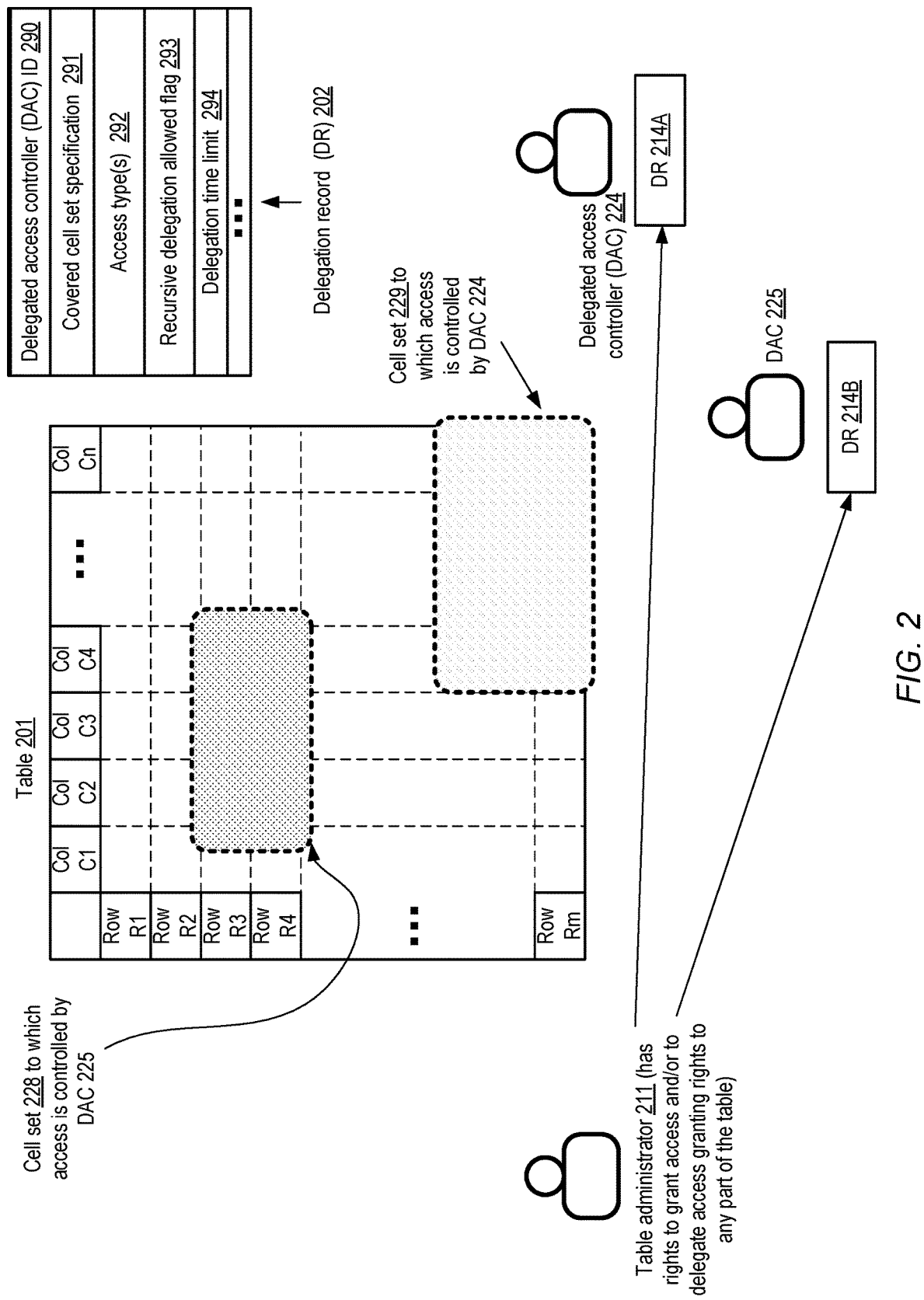
FIG. 2 illustrates an example scenario in which an administrator of a data lake table may delegate access granting rights for various portions of the table to other entities, according to at least some embodiments.

FIG. 2 illustrates an example scenario in which an administrator of a data lake table may delegate access granting rights for various portions of the table to other entities, according to at least some embodiments. In the depicted scenario, a table 201 stored at a data lake management service (DLMS) similar to DLMS 120 of FIG. 1 comprises a plurality of cells arranged in a grid of rows (e.g., Row R1, Row R2, Row R3, Row R4, ..., Row Rm) and columns (Col C1, Col C2, Col C3, Col C4, ..., Col Cn). A table administrator 211 designated for table 201 has the rights to grant access and/or to delegate access granting rights to any part of the table to other entities, such as employees of the organization on whose behalf the table 201 has been stored. Note that in some cases an administrator designated for a data lake instance as a whole may act as table administrator for each table in the data lake instance.

Table 201 may comprise a large number of cells, arranged in some cases in millions of rows and thousands of columns. Furthermore, the number of data accessors who may read or write portions of the table may also be quite large; for large organizations, a staff of hundreds or thousands, whose organizational roles may change from time to time, may need access to the table. However, not all the data accessors may need to access the entire table; in some cases, for privacy and security reasons, access to portions of the table may have to be limited to a small group of accessors.

Table administrator 211 may submit a set of delegation requests to the DLMS in the depicted embodiment to give control over access management of respective portions of the table to delegated access controllers (DACs). The DACs may offload some of the work of granting access rights from the table administrator, and the distribution of access granting rights among multiple DACs may help to ensure that no single entity becomes a bottleneck in the process of granting permissions to access the table data. A given delegation request may comprise several parameters, including for example an indication of the identity of the DAC to whom access granting rights are being delegated, the set of cells for which the DAC will have access granting rights, and so on.

Security configuration managers of the DLMS may validate the delegation requests (e.g., ensuring, using an identity management service similar to IMS 105 of FIG. 1, that the DACs belong to the same organization as the table administrator or table owner, and that authorization roles granted to the DACs allow them to perform access granting rights) in the depicted embodiment. If a delegation request is validated and approved, a corresponding delegation record (DR) 202 may be created and stored in a metadata store of the DLMS in various embodiments. A DR 202 may comprise fields such as a DAC ID 290, a covered cell set specification 291 (indicating the set of cells for which access granting rights are delegated to the DAC), the access type(s) 292 (e.g., reads and/or writes) for which the DAC is being delegated rights, a recursive delegation allowed flag 293, and/or a delegation time limit 294 in some embodiments. If the recursive delegation allowed flag is set to true, the DAC may in turn delegate access granting rights to additional DACs to some of the cells indicated in the covered set cell specification; if the recursive delegation allowed flag is set to false, such multi-level delegation may not be permitted. In some embodiments, when delegating rights, a table administrator 211 may set a time limit 294 after which the delegation of the rights expires, and the DAC no longer has the ability to grant access to the set of cells covered in the DR (unless the delegation request is re-sent or the current delegation of rights is renewed). Other fields may be included in DRs in some embodiments than those shown in FIG. 2.

In the example scenario shown in FIG. 2, DR 214A and DR 214B have been created and stored at the DLMS in response to respective delegation requests from table administrator 211. DR 214A indicates that DAC 224 has been authorized to grant access to any combination of cells of cell set 228 of table 201. DR 214B indicates that DAC 225 has been authorized to grant access to any combination of cells of cell set 229 of table 201.

The covered set cell specification 291 of a DR may indicate the cells for which rights are being delegated in several different ways. In some embodiments, identifiers of the cells (e.g., row and column names of the cells) may be specified—for example, for cell set 228 to which access is controlled by DAC 225 in accordance with DR 214B, an indication of the row and column coordinates (e.g., coordinates in the range (R3, C2) to (R4, C4)) may be stored. In at least one embodiment, a table administrator may instead provide logical predicates to specify the covered cells—e.g., the equivalent of "if the column name includes the string <xyz> and the row identifier includes the string <pqr>" may be used.

Figure 3:
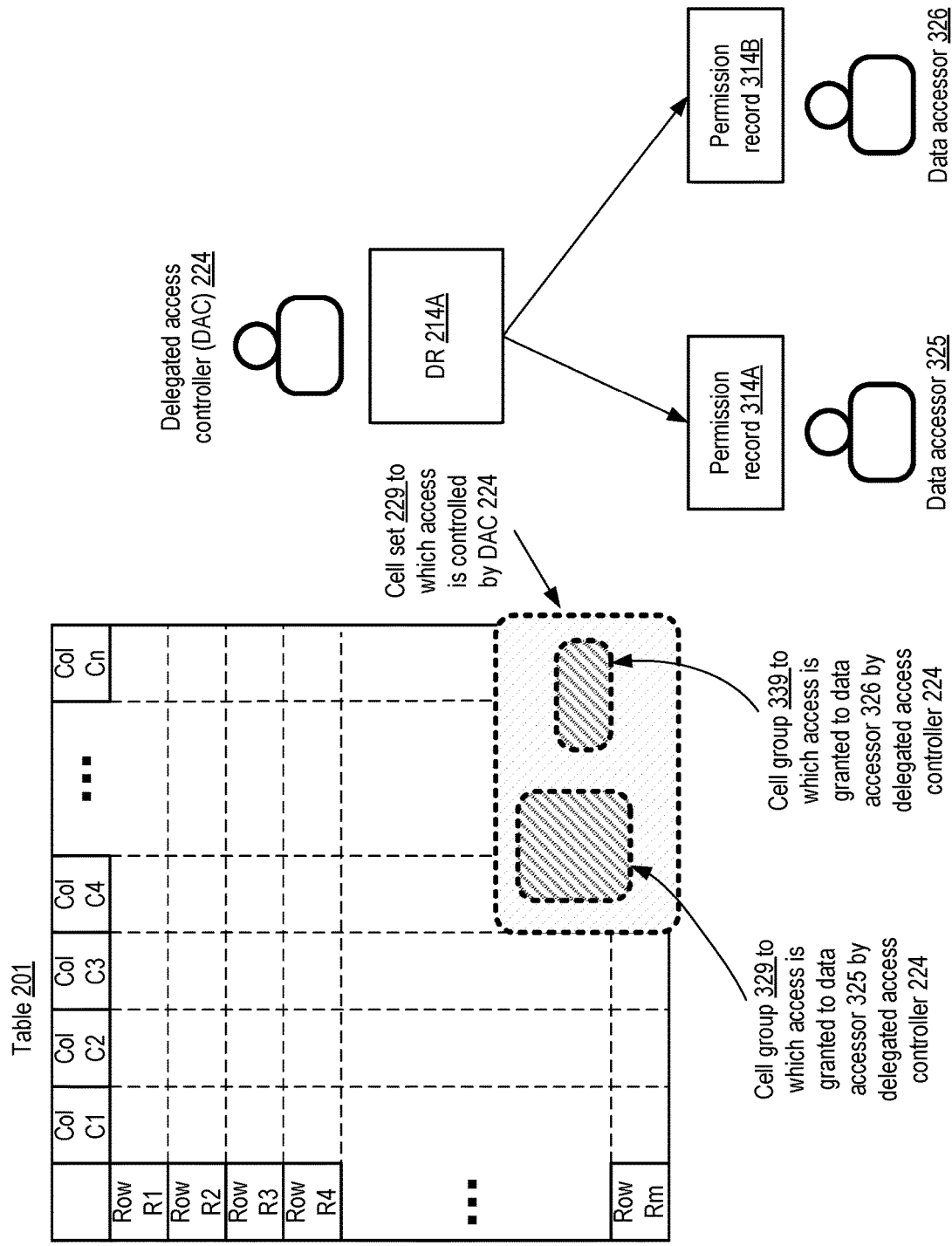
FIG. 3 illustrates an example scenario in which permission may be granted and corresponding permission records may be stored after access granting rights for a portion of a table have been delegated to an entity, to enable data accessors to read or write subsets of the portion, according to at least some embodiments.

FIG. 3 illustrates an example scenario in which permission may be granted and corresponding permission records may be stored after access granting rights for a portion of a table have been delegated to an entity, to enable data accessors to read or write subsets of the portion, according to at least some embodiments. In the scenario shown in FIG. 3, DAC 224, to whom access granting rights for cell set 229 were delegated by a table administrator of table 201 as indicated by DR 214A, has granted permission to respective groups of cells of the set 229 to data accessors 325 and 326.

Data accessor 325 has been granted access to cell group 329 within cell set 229. Data accessor 326 has been granted access to cell group 339 within cell set 229. A respective permission record 314, such as permission record 314A and permission record 314B, may be created and stored in the DLMS metadata associated with table 201 in the depicted embodiment to indicate the granted permissions. A given permission record 314 may, for example, include a specification of the group of cells to which access permission is granted, and an indication of the data accessor to whom the permission is granted. The group of cells covered by the permission record may be specified using cell identifiers and/or logical predicates (similar to the logical predicates discussed above with respect to cell set specifications in delegation records) in different embodiments. In some embodiments, a permission record may also include an expiration time, after which the permission may no longer be valid.

Figure 4:
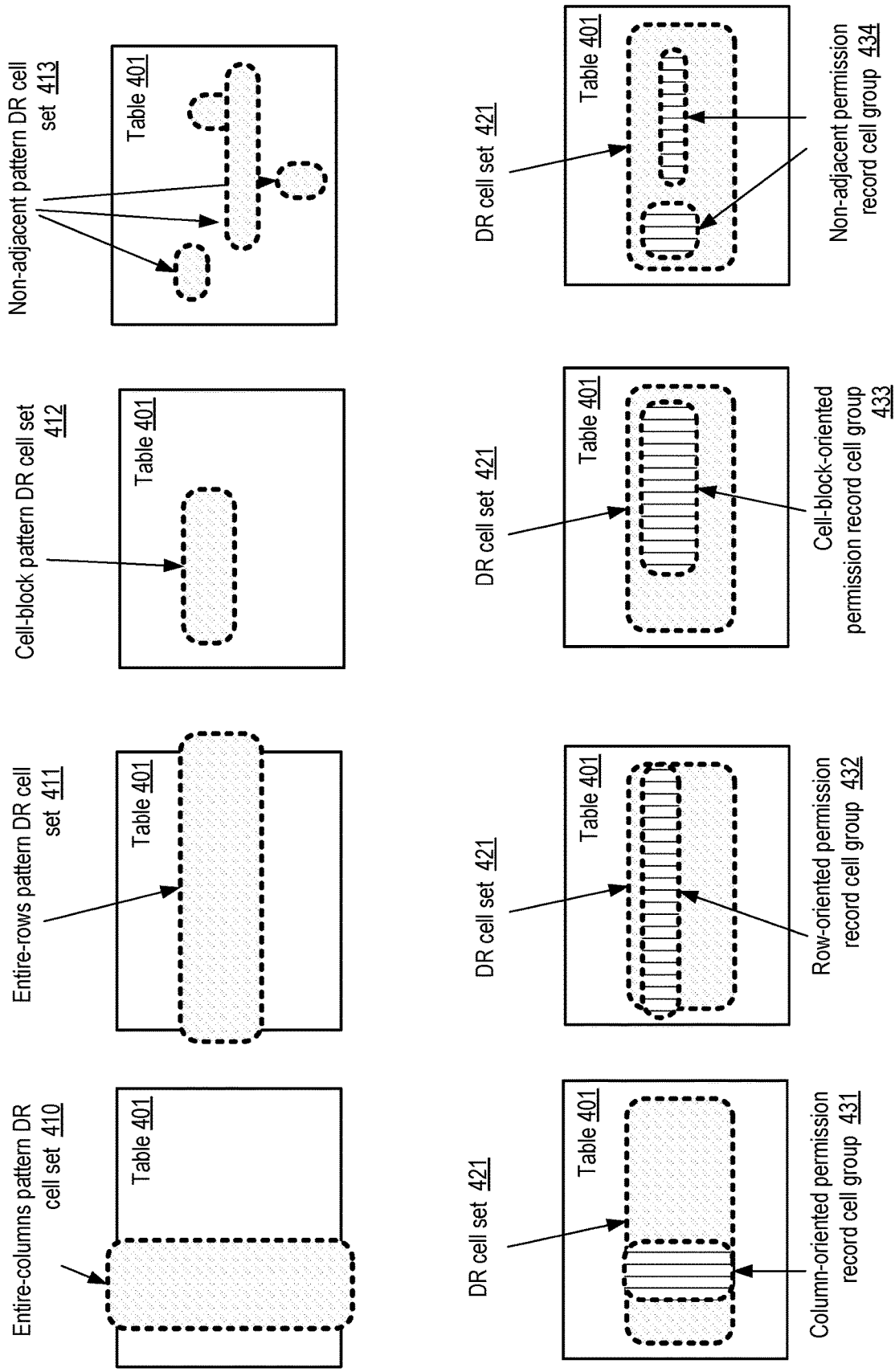
FIG. 4 illustrates examples patterns of cell sets for which access granting rights may be delegated, and example patterns of cell groups within those cell collections for which access permissions may be granted, according to at least some embodiments.

FIG. 4 illustrates examples patterns of cell sets for which access granting rights may be delegated, and example patterns of cell groups within those cell collections for which access permissions may be granted, according to at least some embodiments. In some cases, a table administrator may decide to delegate access granting rights to entire columns of a table 401. An entire-columns pattern DR cell set 410 may include all the cells within one or more columns of all rows, but may exclude one or more cells in one or more other columns of the table. In contrast, an entire-rows pattern DR cell set 411 may include all the cells within all columns of a specified set of one or more rows, while excluding cells within other rows. If the administrator does not want to delegate rights to entire rows or entire columns, the administrator may choose to delegate according to a cell-block pattern. A cell-block pattern DR cell set 412 may comprise adjacent cells within some rows, while not including cells of at least some columns within those rows. In some cases, rights to grant access may be delegated to disjoint groups of cells, as indicated in in non-adjacent pattern DR cell set 413.

Similar types of options may be available to delegated access controllers to grant access to cells within a given sell set indicated in a DR in the depicted embodiment. Within a given DR cell set 421 (arranged in a cell-block pattern in the example shown in FIG. 4), a DAC may select a column-oriented permission record cell group 431, a row-oriented permission record cell group 432, a cell-block-oriented permission record cell group 433, or a non-adjacent permission record cell group 434. In the column-oriented case, all cells (regardless of the row to which they belong) of one or more columns represented in the DR cell set 421 may be included. In the row-oriented case, all cells (regardless of the column to which they belong) of one or more columns represented in the DR cell set 421 may be included. In the cell-block-oriented case, at least one cell of some row represented in the cell group may be excluded. In one embodiment, table administrators and/or delegated access controllers may be provided with graphical user interfaces which can be used to define the boundaries of cell sets (for delegation requests) and cell groups (for granting permissions within the cell sets).

Figure 5:
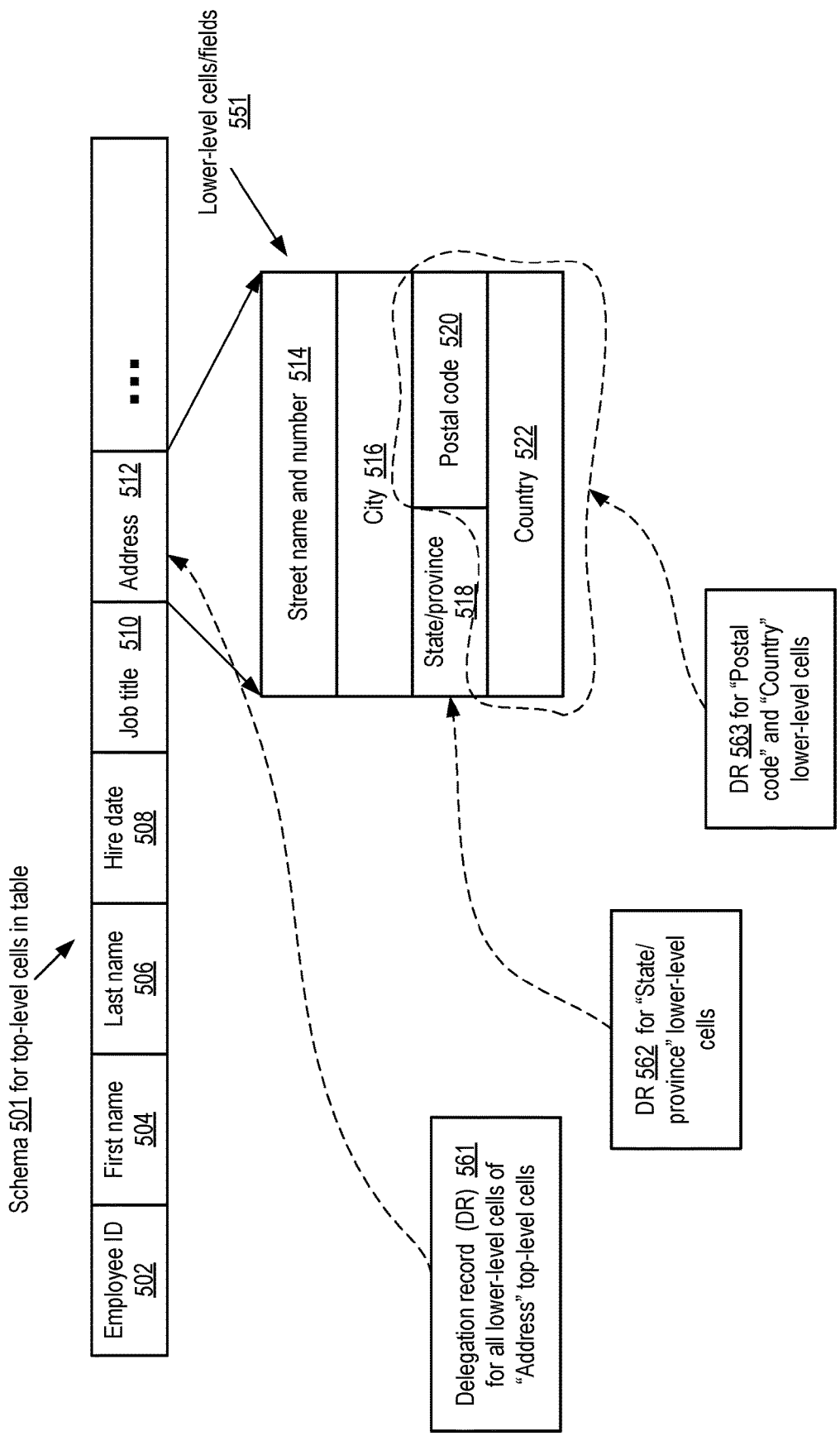
FIG. 5 illustrates an example scenario in which rights to grant access may be delegated at different granularities with respect to contents of a table, according to at least some embodiments.

In some embodiments, a table of a data lake may be modeled using a hierarchy of cells, with some top-level cells of the table schema comprising lower-level cells. FIG. 5 illustrates an example scenario in which rights to grant access may be delegated at different granularities with respect to contents of a table, according to at least some embodiments. A schema 501 of a table used to store data about a set of employees of an organization may for example comprise a number of top-level cells or fields, such as an employee ID 502, a first name 504, a last name 506, a hire date 508, a job title 510, and an address 512. A top-level cell for an address 512 may in turn comprise several lower-level cells/fields 551, such as street name and number 514, city 516, state/province 518, postal code 520, and country 522 in the depicted scenario. As mentioned earlier, in some cases such schemas may be inferred by a data store crawler based on examination of contents of various unstructured or semi-structured data objects within a data source of a data lake.

Delegation records (DRs) may be created for different combinations of top-level cells and lower-level cells in the depicted scenario of desired by the administrator of the table. For example, DR 561 may be created to delegate access granting rights for all lower-level cells of "Address" top-level cells. DR 562 may be created for delegating access granting rights to state/province lower-level cells (without delegating rights to other lower-level cells of the address top-level cells), while DR 563 may be created for delegating access granting rights to postal code and country lower-level cells (also without delegating rights to other lower-level cells of the address top-level cells). In general, rights may be delegated for any desired combination of top-level and lower-level cells. The hierarchy of cells may include multiple layers in some embodiments, and DRs may be created to delegate access granting rights to cells at any desired combination of hierarchy layers. In at least one embodiment, delegated access controllers may grant permissions (and cause corresponding permission records to be stored) for any desired combination of cells at any level or levels of the hierarchy.

Figure 6:
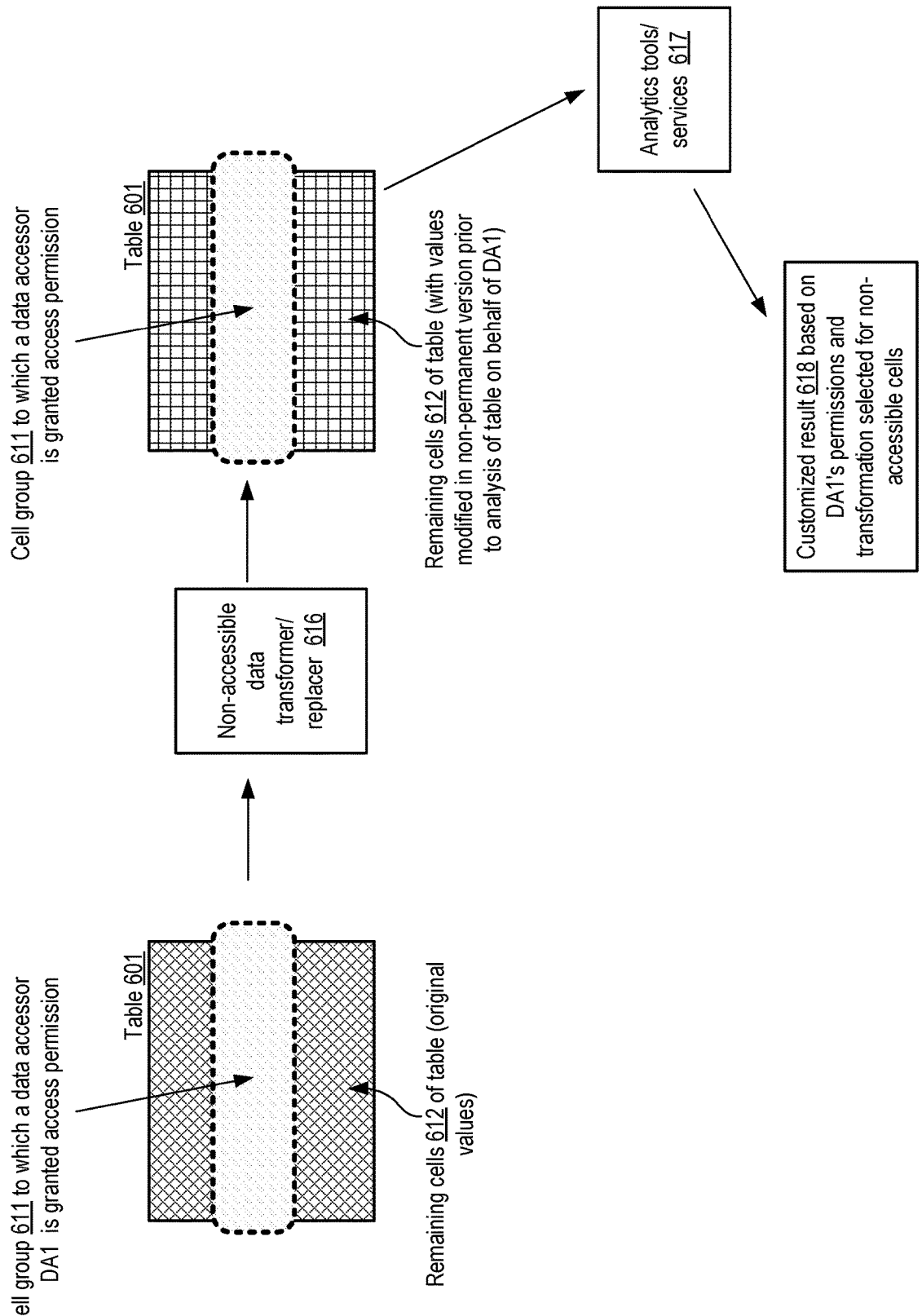
FIG. 6 illustrates an example scenario in which data in a portion of a table to which a data accessor does not have access may be automatically modified before an analysis operation is performed on behalf of the data accessor, according to at least some embodiments.

FIG. 6 illustrates an example scenario in which data in a portion of a table to which a data accessor does not have access may be automatically modified before an analysis operation is performed on behalf of the data accessor, according to at least some embodiments. In the scenario depicted in FIG. 6, a run-time access permission checking manager of a DLMS similar in features and functionality to DLMS 120 of FIG. 1 may have identified the set of permission records applicable to a given data accessor DA1 and a given table 601, and determined that the data accessor has permission to read cell group 611 of the table, but that DA1 does not have access to remaining cells 612 of the table. An analytics request or query to be processed on behalf of DA1 may require examination of at least some of the remaining cells as well—for example, an aggregate value for the contents of a column for the whole table may have to be provided in response to a query.

To help deal with such analysis requests without revealing the actual or original values stores in remaining cells 612, a non-accessible data transformer/replacer 616 (which may be implemented as part of a data retriever component of the DLMS) may be employed in the depicted embodiment. The data transformer/replacer may replace, within a version of table 601 that is provided to analytics/tools services 617, the original values in some or all of the remaining cells 612 with modified values. Rules indicating how such modified values are to be determined may be indicated by the table administrator and stored as part of the table metadata in some embodiments. For example, for some numeric fields, an estimated average value may be included instead of the original or true values in accordance with such a rule; for text fields, a portion of the text may be replaced by a string such as "---", and so on. A customized result 618 to the analysis request of DA1 may be generated by the analytics tools/services 616, using the permissions granted to DA1 and the transformation/replacement rules indicated by the administrator for the non-accessible cells of the table. Note that in various embodiments the original version of the table data may remain unmodified in the storage repository of the DLMS; the modified version of the table may be generated dynamically for the purpose of responding to the request from DA1, may not necessarily be stored permanently, and may be discarded after the response to the request has been prepared.

Figure 7:
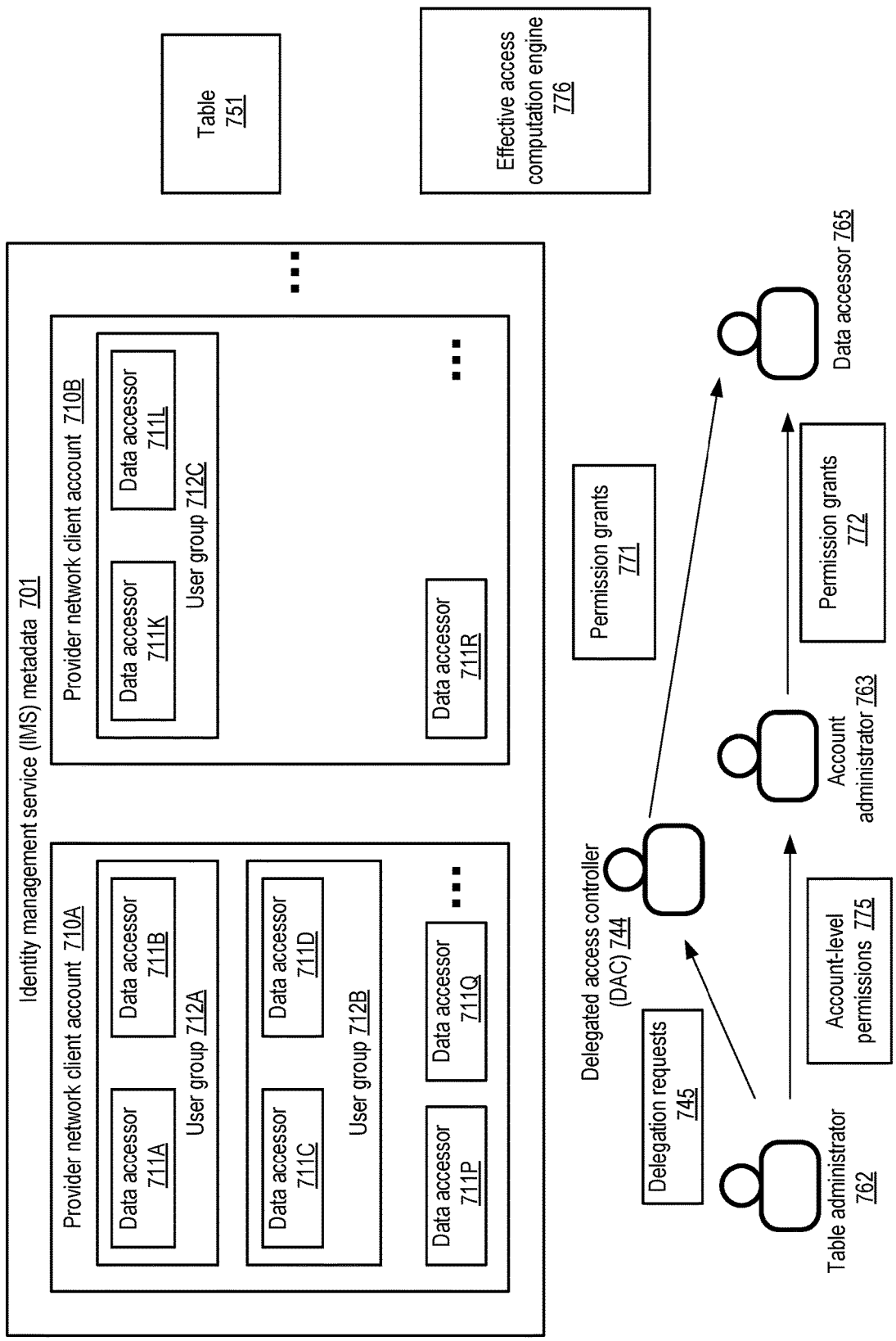
FIG. 7 illustrates an example scenario in which an effective access computation engine may analyze a variety of permission records applicable to a data accessor to determine whether the data accessor can read or write a portion of a table, according to at least some embodiments.

FIG. 7 illustrates an example scenario in which an effective access computation engine may analyze a variety of permission records applicable to a data accessor to determine whether the data accessor can read or write a portion of a table, according to at least some embodiments. In the embodiment depicted in FIG. 7, data accessors that need to access a table 751 managed at a DLMS may be affiliated with or belong to respective provider network client accounts. Information about the relationships between provider network client accounts (which may for example be set up for organizations or departments to which the data accessors belong) and individual user accounts of the data accessors may be stored, for example, as part of identity management service (IMS) metadata 701 at a service similar to IMS 105 of FIG. 1 in the depicted embodiment. Access to a given table such as table 751 may be shared among data accessors affiliated with multiple provider network client accounts in the depicted embodiment. An effective access computation engine 776, implemented for example using resources of runtime access permission checking managers of the DLMS, may be responsible for identifying the permission record(s) pertaining to a given data accessor at run time (e.g., when a request to access the table 751 is received) and analyzing the permission record(s) to determine which portions of the table can be accessed on behalf of the data accessor.

IMS metadata 701 shows data accessors associated with two provider network client accounts 710A and 710B in the example scenario of FIG. 7. In addition to associations between individual data accessors 711 and client accounts, user groups may also be defined, e.g., to enable access permissions to be granted collectively at a group level instead of or in addition to at the level of individual data accessors. Data accessors 711A and 711B belong to user group 712A associated with client account 710A, data accessors 711C and 711D belong to user group 712B associated with client account 710A, and data accessors 711K and 711L belong to user group 712C associated with client account 710B. Some data accessors, such as data accessors 711P and 711Q of client account 710A, and data accessor 711R of client account 710B, may not belong to user groups.

A table administrator 762 may submit delegation requests 745 delegating rights to grant access to portions of table 751 to one or more DACs 744 in the depicted embodiment. The DACs in turn may grant permissions (e.g., via permission grants 771) to individual data accessors 765 or to user groups of data accessors. The table administrator 762 may grant account-level permissions 775 for table 751 to account administrators 763 of the provider network client accounts, enabling the account administrators to also grant permissions (via permission grants 772) to individual data accessors or user groups. In some cases, the permissions granted by an account administrator 763 may be more restrictive than the account-level permissions 775—for example, the table administrator may enable the account administrator to grant access to any portion of table 751, but the account administrator may wish to restrict access permission for a particular data accessor 765 to a subset of the table.

The effective access computation engine 776 may thus have to take various kinds of permission records into account when deciding which portions, if any, of table 751 a data accessor 765 can access. Indexes to help quickly identify permissions granted to client accounts, user groups, and individual data accessors may be generated and maintained in some embodiments. Set computation operations such as unions between the cells indicated in different permission records, or intersections between the cells indicated in different permission records, may be performed by the effective access computation engines in various embodiments to enable responses to access requests to be generated.

Figure 8:
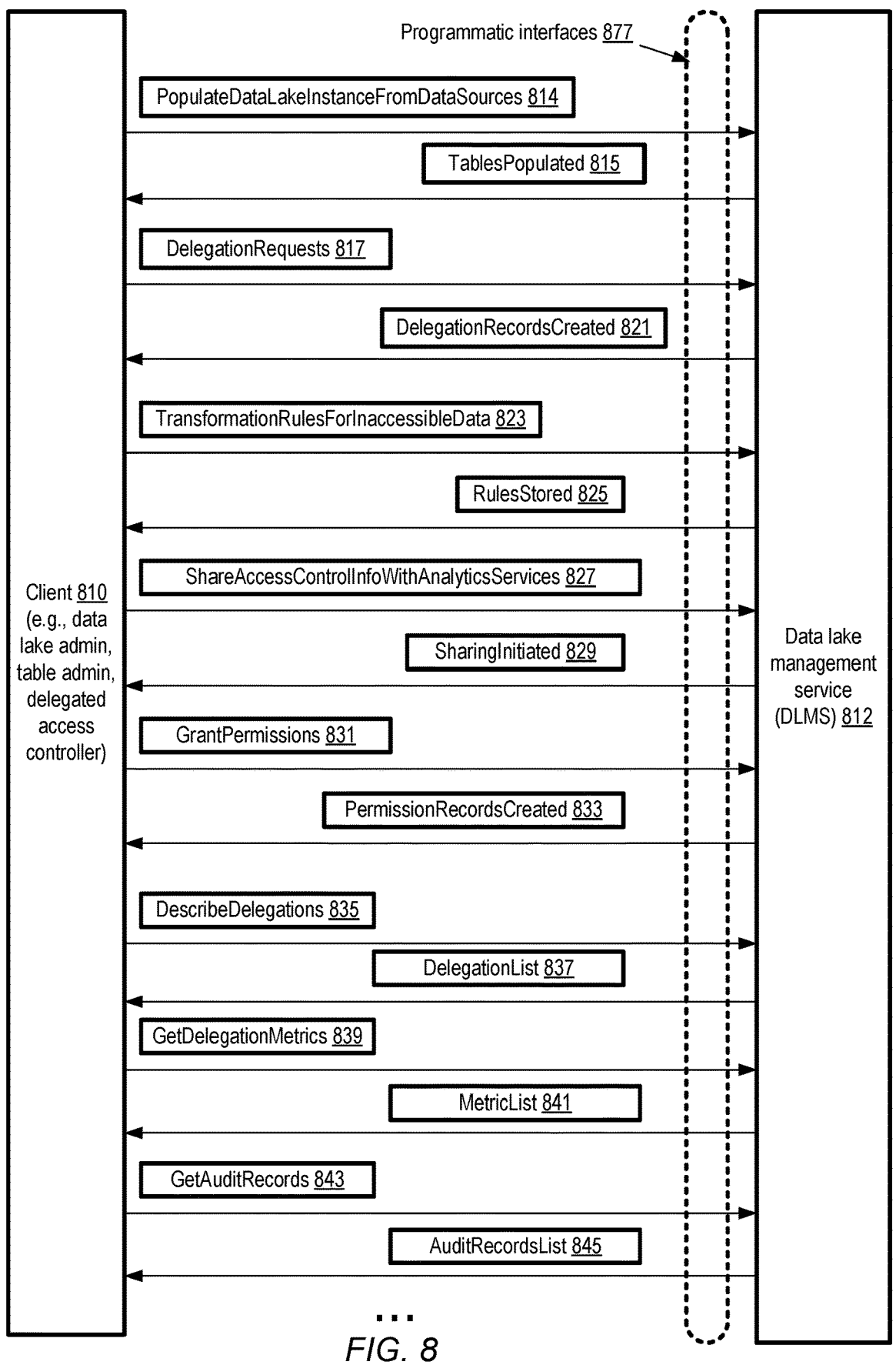
FIG. 8 illustrates example programmatic interactions between clients and a cloud-based data lake management service, according to at least some embodiments.

FIG. 8 illustrates example programmatic interactions between clients and a cloud-based data lake management service, according to at least some embodiments. The DLMS 812, implemented at a provider network similar to provider network 102 of FIG. 1, may implement a set of programmatic interfaces 877, such as one or more web-based consoles, command-line tools, APIs, graphical user interfaces and the like for current or prospective service clients in the depicted embodiment. Using the interfaces 877, a client 810 may (such as a data lake administrator, a table administrator, or a delegated access controller) may submit various types of requests to the DLMS and receive corresponding responses. A PopulateDataLakeInstance-FromDataSources request 814 may be submitted via the interfaces in various embodiments, indicating one or more data sources whose data is to be included in a new data lake instance, and in some cases identifying the data extraction and transformation tools (including crawlers) that should be used to populate tables of the data lake instance. After the data sources have been examined, with table schemas being inferred automatically if needed by the crawlers or other tools, the data may be loaded into the data lake's own storage repository and a TablesPopulated message 815 may be sent to the client. The inferred schema (e.g., including column identifiers and/or row identifiers) for various tables may be indicated in the TablesPopulated message in some embodiments, enabling the client to specify cell sets for delegation requests.

DelegationRequests 817 may specify portions (or all cells) of one or more tables for which the client wishes to delegate access permission granting rights to one or more delegated access controllers in the depicted embodiment. A given delegation request may result in the creation and storage of one or more delegation records with elements similar to those shown in FIG. 2. A DelegationRecordsCreated message 821 may be sent to the client after the delegation records have been stored in DLMS metadata.

If a client wishes to transform or substitute values in inaccessible portions of an table, e.g., using the kind of approach shown in FIG. 6, rules for modifying the inaccessible cells for a given data accessor (or multiple data accessors) may be specified via TransformationRulesForInaccessibleData messages 823 in the depicted embodiment. The rules may be saved at the DLMS, and a RulesStored message 825 may be sent to the client in some embodiments. The transformation rules may also be referred to as masking rules. In one example, inaccessible integer or numeric columns may be replaced by 0, −1, an estimated average or median value, and so on in accordance with a transformation rule specified by the client. In one embodiment, instead of transforming or substituting contents of a table, an administrator may specify a rule that causes access requests to fail if the data accessor does not have permission to access at least one cell that would otherwise (if the permission had been granted to the data accessor) have been accessed to fulfill the request.

In some embodiments, a client such as a table owner or a data lake administrator may wish to automatically provide access control information pertaining to a table or tables to one or more analytics services, so that for example the analytics services can themselves determine the portions of the tables which can be accessed on behalf of a data accessor. In one embodiment, a ShareAccessControlInfoWithAnalyticsServices request 827 may be sent by a client to the DLMS, indicating the tables and the analytics services to which the access control information should be transmitted. A SharingInitiated message 829 may be sent back to the client in the depicted embodiment, indicating that the DLMS has stored metadata identifying the analytics services and the tables and that access control information has been and will continue to be transmitted to the analytics services as requested.

A delegated access controller, a table administrator or an account administrator may submit GrantPermissions requests 831 indicating the portions of tables to which access is being permitted in the depicted embodiment. Corresponding permission records may be generated and stored at the DLMS, and a PermissionRecordsCreated message 833 may be sent to the client.

A DescribeDelegations request 835 may be submitted by a table administrator to determine the set of delegations for various parts of the table in some embodiments. A list of delegation records pertaining to the table may be provided via one or more DelegationList messages 837.

According to one embodiment, metrics pertaining to the delegation of access grant rights may be collected and stored at the DLMS. For example, the number of delegation records created for one or more data lake tables, the average number of cells covered by the delegation records, the average number of permission records created by each delegated access controller, the duration of the delegations, and so on, may be included in the metrics. A client 810 such as a data lake administrator or a table administrator may submit a GetDelegationMetrics request 839 to obtain such metrics, and the requested metrics may be provided via one or more MetricList messages 841. A client may submit a GetAuditRecords request 843 to obtain audit records associated with one or more tables (including records indicating delegation of access permission granting powers to access controllers, records indicating grants of access permissions, records of read and/or write accesses, and so on in some embodiments. The requested set of audit records may be provided to the client via one or more AuditRecordsList messages 845 in the depicted embodiment. It is noted that other types of programmatic interactions pertaining to delegated fine-grained access control for data lakes may be supported in some embodiments than those shown in FIG. 8.

Figure 9:
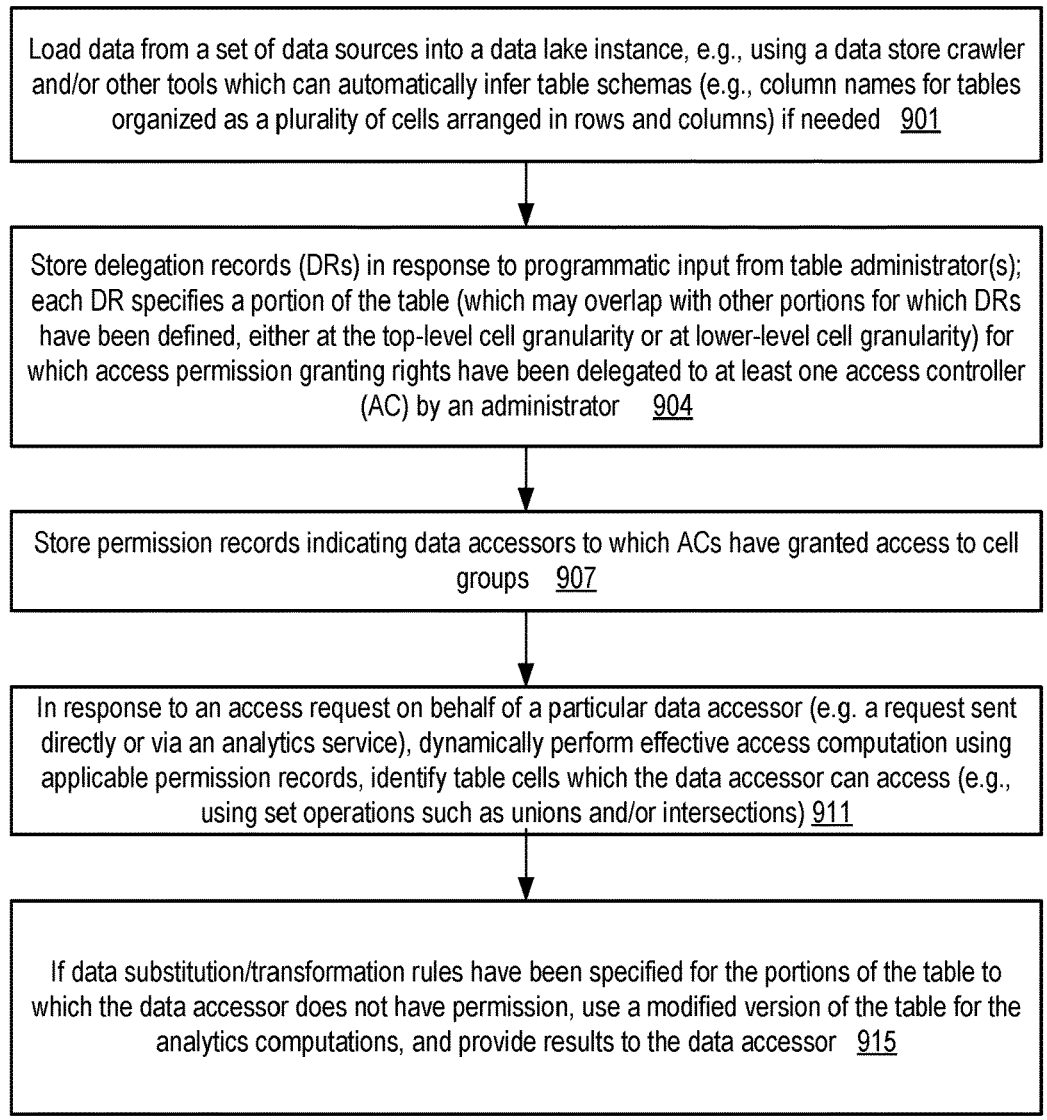
FIG. 9 is a flow diagram illustrating aspects of operations which may be performed to support fine-grained delegated access control for data lakes, according to at least some embodiments.

FIG. 9 is a flow diagram illustrating aspects of operations which may be performed to support fine-grained delegated access control for data lakes, according to at least some embodiments. As shown in element 901, data from one or more data sources may be loaded into a data lake instance, e.g., using a data store crawler and/or other tools which can automatically infer table schemas (such as column names for tables organized as a plurality of cells arranged in rows and columns) if required. Depending on the data source, in some cases table schemas may not have to be inferred—e.g., some of the data incorporated into the data lake instance may be stored in a relational database management service, in which case the schema for one or more tables of the data lake instance may have been defined in advance and need not be inferred. Other data may be stored in unstructured form, e.g., at an object storage service or a non-relational data store, and schemas for tables generated from such data may be inferred. In at least some embodiments, a DLMS similar in features and functionality to DLMS 120 of FIG. 1 may be used to manage the data lake instance.

In response to programmatic input such as respective delegation requests from an administrator (e.g., a table administrator or a data lake instance administrator), delegation records (DR) may be stored as part of the metadata associated with the data lake instance in various embodiments (element 904). The administrator may be authorized to delegate, to other entities or individuals referred to as delegated access controllers, the rights to grant access to various portions of a table; for example, individuals that may not necessarily be designated as administrators of the entire table but may be trusted parties belong to the organization for which the data lake instance is set up may be designated as delegated access controllers A given DR may specify a portion of a table (e.g., a set of cells, specified in any of various ways such as using cell identifiers or using logical predicates) for which access permission granting rights have been delegated by the administrator to an access controller. The sets of cells covered by different DRs may overlap in some cases, and need not necessarily be disjoint. In some embodiments, the cells of a table may be organized in a hierarchy, with some types of top-level cells comprising one or more types of lower-level cells. In such embodiments, rights may be delegated at any desired granularity or level of the hierarchy, e.g., at the top-level cell level (in which case the delegated access controller may grant permissions to all lower-level cells of a top-level cell), or for a subset of lower-level cells of a given type of top-level cell.

After the administrator has delegated the rights, a delegated access controller may start granting permission (with respect to at least a subset of the cells indicated in the applicable DR) to data accessors such as readers or writers in the depicted embodiment. Respective permission records indicating the data accessors to whom access permission has been granted may also be stored as part of the metadata associated with a table (element 907). For large tables, there may be numerous delegated access controllers, each of whom may in turn cause numerous permission records to be created, resulting in a potentially very large collection of permission records for different combinations of table cells and data accessors; a given data accessor may be granted permission by several different access controllers to respective groups of cells, in some cases being granted permission to access the same cell by multiple delegated access controllers.

In response to an access request on behalf of a particular data accessor (e.g., a request sent directly to a DLMS by the data accessor, or a request sent from an analytics service to whom the data accessor sent an analytics request that requires access to the table), an effective access computation may be performed in various embodiments (element 911). To perform the effective access computation, the set of permission records that are applicable to the data accessor and the table may be identified, e.g., using indexes created on data accessors, tables, administrator-specified tags, etc. and set operations such as union operations and/or intersection operations may be executed with regard to the cell subsets indicated in the permission records to identify the group of cells (if any) to which the data accessor has permission. Note that a given access request may in some cases require access to cells from multiple tables, so permission records for the different tables may have to be identified and analyzed in the effective access computations in some cases.

In some cases, a response to the access request may be generated using just the cells to which the data accessor has been granted permission. In other cases, e.g., if data substitution/transformation rules have been specified for the portions of the table to which the data accessor was not granted permission, a modified version of the table may be used to respond to the access request (element 915), e.g., to perform analytics operations. In the modified version of the table (which may not necessarily be stored in persistent storage of the data lake, and may not overwrite the original version of the table), values in one or more cells may be replaced based on the substitution/transformation rules. Results of the data access request may be provided to the data accessor.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
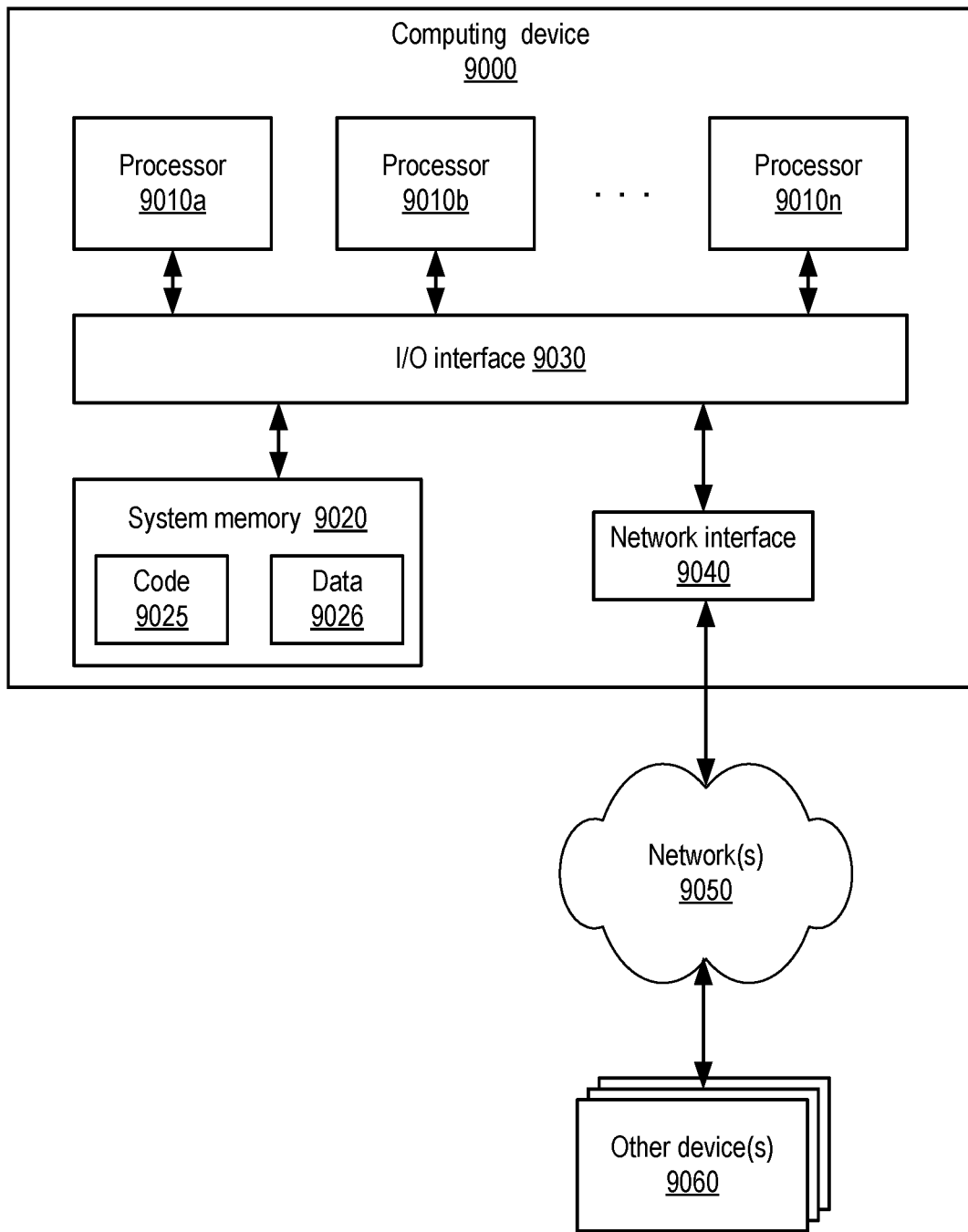
FIG. 10 is a block diagram illustrating an example computing device that may be used in at least some embodiments.

In at least some embodiments, a server that implements the types of techniques described herein (e.g., including functions of a DLMS and/or other services of a cloud provider network) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
store, in response to one or more delegation requests received via one or more programmatic interfaces of a data lake management service of a cloud provider network from an administrator of a table stored at the data lake management service, a plurality of delegation records associated with the table, wherein the table comprises a plurality of cells, wherein the administrator is authorized to delegate access granting rights pertaining to the table, and wherein the plurality of delegation records include (a) a first delegation record identifying a first access controller authorized to grant access to a first set of cells of the table and (b) a second delegation record identifying a second access controller authorized to grant access to a second set of cells of the table;
store a first permission record indicating that a first data accessor has been granted access by the first access controller to a first subset of cells of the first set of cells;
store a second permission record indicating that the first data accessor has been granted access by the second access controller to a second subset of cells of the second set of cells; and
in response to an access request from the first data accessor,
identify a group of permission records applicable to the first data accessor, including the first permission record and the second permission record;
determine, using permission records of the group, a first collection of one or more cells to which the first data accessor has access, wherein the first collection includes a first cell comprising a first data value, and wherein the first collection excludes a second cell comprising a second data value; and
cause a modified version of the table to be utilized to respond to the access request, wherein in the modified version, the second data value of a second cell is replaced by a third data value, and the first data value of the first cell is not replaced by any other data value.

2. The system as recited in claim 1, wherein to determine, using permission records of the group, the first collection of one or more cells to which the first data accessor has access, the one or more computing devices include further instructions that upon execution on or across the one or more computing devices:
perform one or more set computations on respective subsets of cells indicated in individual ones of the permission records of the group.

3. The system as recited in claim 1, wherein the plurality of cells of the table are arranged in a plurality of rows and a plurality of columns, wherein the first set of cells includes cells within one or more rows of the plurality of rows, and wherein the first set of cells does not include cells of at least one row of the plurality of rows.

4. The system as recited in claim 1, wherein the plurality of cells of the table are arranged in a plurality of rows and a plurality of columns, wherein the first set of cells includes cells within one or more columns of the plurality of columns, and wherein the first set of cells does not include cells of at least one column of the plurality of columns.

5. The system as recited in claim 1, wherein the plurality of cells of the table are arranged in a plurality of rows and a plurality of columns, wherein the first set of cells includes one or more cells within a particular row of the plurality of rows, and wherein the one or more cells within the particular row do not include a cell of at least a particular column of the plurality of columns.

6. A computer-implemented method, comprising:
storing a plurality of delegation records associated with a table of a storage management service, wherein the table comprises a plurality of cells, and wherein the plurality of delegation records include (a) a first delegation record identifying a first access controller authorized to grant access to a first set of cells of the table and (b) a second delegation record identifying a second access controller authorized to grant access to a second set of cells of the table;
storing a first permission record indicating that a first data accessor has been granted access by the first access controller to a first subset of cells of the first set of cells;
storing a second permission record indicating that the first data accessor has been granted access by the second access controller to a second subset of cells of the second set of cells;
in response to receiving an access request on behalf of the first data accessor,
determining, using a plurality of permission records pertaining to the first data accessor, including the first permission record and the second permission record, a first collection of one or more cells to which the first data accessor has access; and
causing a response to the access request to be generated using contents of at least the first collection of one or more cells.

7. The computer-implemented method as recited in claim 6, wherein the plurality of cells of the table are arranged in a plurality of rows and a plurality of columns, wherein the first set of cells includes cells within one or more rows of the plurality of rows, and wherein the first set of cells does not include cells of at least one row of the plurality of rows.

8. The computer-implemented method as recited in claim 6, wherein the plurality of cells of the table are arranged in a plurality of rows and a plurality of columns, wherein the first set of cells includes cells within one or more columns of the plurality of columns, and wherein the first set of cells does not include cells of at least one column of the plurality of columns.

9. The computer-implemented method as recited in claim 6, wherein the plurality of cells of the table are arranged in a plurality of rows and a plurality of columns, wherein the first set of cells includes one or more cells within a particular row of the plurality of rows, and wherein the one or more cells within the particular row do not include a cell of at least a particular column of the plurality of columns.

10. The computer-implemented method as recited in claim 6, wherein at least one cell included in the first set of cells is also included in the second set of cells.

11. The computer-implemented method as recited in claim 6, wherein the first permission record indicates a plurality of data accessors to which access to the first subset of cells is granted, including the first data accessor, wherein the plurality of data accessors comprises one or more of: (a) users associated with a provider network client account or (b) users belonging to a particular user group of a plurality of user groups defined at an identity management service.

12. The computer-implemented method as recited in claim 6, wherein a particular cell of the first set of cells comprises a plurality of lower-level cells, the computer-implemented method further comprising:
storing a third permission record indicating that a third data accessor has been (a) granted access by the first access controller to a first lower-level cell of the plurality of lower-level cells, and (b) has not been granted access to a second lower-level cell of the plurality of lower-level cells.

13. The computer-implemented method as recited in claim 6, wherein the first delegation record comprises a logical predicate to be used to identify cells of the first set of cells, wherein the first delegation record does not include an identifier of a cell of the first set of cells, and wherein the second delegation record includes an identifier of a cell of the second set of cells.

14. The computer-implemented method as recited in claim 6, wherein the first permission record indicates that the first data accessor has been granted read access to the first subset of cells, the method further comprising:
storing a third permission record indicating that the first data accessor has been granted write access by the first access controller to a third subset of cells of the first set of cells.

15. The computer-implemented method as recited in claim 6, wherein the table is stored at a data lake management service of a cloud provider network, the computer-implemented method further comprising:
transmitting, from the data lake management service to an analytics service of the cloud provider network, a representation of a plurality of permission records pertaining to the first data accessor including the first permission record and the second permission record; and
utilizing, by the analytics service, the plurality of permission records to respond to an analytics request from the first data accessor.

16. One or more non-transitory computer-accessible storage media storing program instructions that when executed on or across one or more processors:
store a plurality of delegation records associated with a table of a storage management service, wherein the table comprises a plurality of cells, and wherein the plurality of delegation records include (a) a first delegation record identifying a first access controller authorized to grant access to a first set of cells of the table and (b) a second delegation record identifying a second access controller authorized to grant access to a second set of cells of the table;
store a first permission record indicating that a first data accessor has been granted access by the first access controller to a first subset of cells of the first set of cells;
store a second permission record indicating that the first data accessor has been granted access by the second access controller to a second subset of cells of the second set of cells;
in response to receiving an access request of the first data accessor,
determine, using a plurality of permission records pertaining to the first data accessor, including the first permission record and the second permission record, a first collection of one or more cells to which the first data accessor has access; and
cause a response to the access request to be generated using contents of at least the first collection of one or more cells.

17. The one or more non-transitory computer-accessible storage media as recited in claim 16, wherein the plurality of cells of the table are arranged in a plurality of rows and a plurality of columns, wherein the first set of cells includes cells within one or more rows of the plurality of rows, and wherein the first set of cells does not include cells of at least one row of the plurality of rows.

18. The one or more non-transitory computer-accessible storage media as recited in claim 16, wherein the plurality of cells of the table are arranged in a plurality of rows and a plurality of columns, wherein the first set of cells includes cells within one or more columns of the plurality of columns, and wherein the first set of cells does not include cells of at least one column of the plurality of columns.

19. The one or more non-transitory computer-accessible storage media as recited in claim 16, storing further program instructions that when executed on or across the one or more processors:

provide, via one or more programmatic interfaces, an audit record indicating one or more of: (a) a creation of the first delegation record, (b) a creation of the first permission record, or (c) the access request.

20. The one or more non-transitory computer-accessible storage media as recited in claim 16, wherein the table is stored at a data lake management service, the one or more non-transitory computer-accessible storage media storing further program instructions that when executed on or across one or more processors:

automatically infer, using a crawler configured to analyze at least a portion of a non-relational data store external to the data lake management service, a schema indicating a plurality of columns of the table, wherein individual cells of the plurality of cells belong to a particular column of the plurality of columns;

present an indication of the plurality of columns to an administrator of the table via one or more programmatic interfaces of the data lake management service; and obtain, via the one or more programmatic interfaces from the administrator, an indication of a particular column of the plurality of columns to which a particular cell of the first set of cells belongs.

\* \* \* \* \*